United States Patent
Ozawa et al.

(10) Patent No.: US 11,752,854 B2
(45) Date of Patent: Sep. 12, 2023

(54) BATTERY PROTECTION APPARATUS AND VEHICLE INCLUDING THE SAME

(71) Applicant: HONDA MOTOR CO., LTD., Tokyo (JP)

(72) Inventors: Hiroyuki Ozawa, Tokyo (JP); Yusuke Okamoto, Tokyo (JP); Shoshi Hidaka, Guangzhou (CN)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 17/512,711

(22) Filed: Oct. 28, 2021

(65) Prior Publication Data
US 2022/0134858 A1    May 5, 2022

(30) Foreign Application Priority Data
Oct. 29, 2020  (CN) .......................... 202011180289.1

(51) Int. Cl.
*B60K 1/04*    (2019.01)
*H01M 50/204*    (2021.01)
*H01M 50/264*    (2021.01)
*B60L 50/64*    (2019.01)
*H01M 50/691*    (2021.01)

(52) U.S. Cl.
CPC ................ *B60K 1/04* (2013.01); *B60L 50/64* (2019.02); *H01M 50/204* (2021.01); *H01M 50/264* (2021.01); *H01M 50/691* (2021.01); *B60K 2001/0438* (2013.01); *H01M 2220/20* (2013.01)

(58) Field of Classification Search
CPC ... B60K 1/04; B60K 2001/0438; B60L 50/64; B60L 3/0007; H01M 50/204; H01M 50/264; H01M 50/691; H01M 2200/20; H01M 50/242
See application file for complete search history.

(56) References Cited

U.S. PATENT DOCUMENTS

2016/0114699 A1*  4/2016  Hokazono ................ B60K 1/04
                                             180/68.5
2021/0094624 A1*  4/2021  Takahashi .......... B62D 25/2036

FOREIGN PATENT DOCUMENTS

CN    207781703 U    8/2018
CN    208324862 U    1/2019

\* cited by examiner

*Primary Examiner* — Jason D Shanske
*Assistant Examiner* — James J Triggs
(74) *Attorney, Agent, or Firm* — AMIN, TUROCY & WATSON, LLP

(57) ABSTRACT

A battery protection apparatus provided under a side sill of a vehicle and provided at least in a side surface of a battery pack under the vehicle, includes a protection apparatus main body, wherein a protrusion portion extending downwardly is formed in the side sill of the vehicle, the protrusion portion is positioned between the protection apparatus main body and the battery pack, and in a vertical direction, the highest point of the protection apparatus main body is higher than the lowest point of the protrusion portion with respect to the horizontal plane.

12 Claims, 3 Drawing Sheets

BATTERY PROTECTION APPARATUS AND VEHICLE INCLUDING THE SAME

CROSS-REFERENCE TO RELATED APPLICATION

The priority is claimed based on a Chinese Patent Application No. 202011180289.1, filed on Oct. 29, 2020. The content of the Chinese Patent Application is incorporated herein by reference.

Technical Field

The present disclosure relates to a technical field of an electric vehicle. More specifically, the present disclosure relates to a battery protection apparatus and a vehicle including the battery protection apparatus.

Background Art

An electric vehicle is a development trend in the future. A battery pack is a core part for providing the power to the vehicle such that it is very important to protect the battery pack. Generally, a protection apparatus is provided on a side surface of the battery pack to protect the battery pack.

A collision protection apparatus disclosed in Patent Document 1 includes a collision prevention beam and an energy absorption beam disposed at the side of the collision prevention beam, wherein the energy absorption beam is crumpled to absorb the energy. When the collision occurs, the collision prevention beam comes in contact with the protrusion on the ground to absorb part of the collision energy, and the remaining collision energy is transmitted to the energy absorption beam via the collision prevention beam. The energy absorption beam is crumpled and shrunken to absorb the majority of the collision energy so as to protect the battery pack. However, since the collision protection apparatus cannot suitably cover the side surface of the battery pack, when the collision prevention beam receives the collision, it is easy for the collision prevention beam to deform upwardly or downwardly to collide with a portion of the battery pack that is not protected by the collision protection apparatus and cause the damage to the battery pack.

A battery pack case being beneficial for the safety of the battery pack during the vehicle collision is disclosed in Patent Document 2. The battery pack case includes a battery case vertical surface and an installation frame. A cross section of the installation frame has a substantial triangle shape. However, the installation frame having the triangle-shaped cross section is formed as a portion of the battery pack case such that the weight of the vehicle increases due to the battery pack case to affect the fuel consumption performance. Furthermore, when the collision occurs, it is easy for the battery pack to be damaged such that the battery pack case cannot suitably protect the battery pack.

CITATION LIST

Patent Document

[Patent Document 1] Chinese Utility Model Application Publication No. 207781703U
[Patent Document 2] Chinese Utility Model Application Publication No. 208324862U

SUMMARY

The present application is made in consideration of the above circumstances, and an objection of the present disclosure is to provide a battery protection apparatus and a vehicle including the battery protection apparatus to effectively protect the side surface of the battery pack.

According to an aspect of the present disclosure, a battery protection apparatus provided under a side sill of a vehicle and provided at least in a side surface of a battery pack under the vehicle, includes a protection apparatus main body, wherein a protrusion portion extending downwardly is formed in the side sill of the vehicle, the protrusion portion is positioned between the protection apparatus main body and the battery pack, and in a vertical direction, the highest point of the protection apparatus main body is higher than the lowest point of the protrusion portion with respect to the horizontal plane.

The protection apparatus main body is formed in the side surface of the battery pack so as to effectively protect the battery pack. At the same time, the protrusion portion of the side sill of the vehicle is positioned between the battery pack and the protection apparatus main body, and the highest point of the protection apparatus main body is higher than the lowest point of the protrusion portion such that when the vehicle receives the collision force, the protection apparatus main body moves toward the battery pack side by receiving the collision force and comes in contact with the protrusion portion. Accordingly, majority of the force is dispersed to the side sill of the vehicle and it is possible to reduce the impact to the battery pack. Due to the double protection by the protection apparatus main body and the protrusion portion, it is possible to protect the battery pack more suitably.

According to another aspect of the present disclosure, gaps may be formed between the protection apparatus main body and the protrusion portion, and between the protrusion portion and the battery pack.

Due to the gaps formed between the protection apparatus main body and the protrusion portion, and between the protrusion portion and the battery pack, a certain part of the collision force can be absorbed so as to reduce or prevent the impact due to the collision force to the battery pack.

According to another aspect of the present disclosure, a fixation portion may be provided in the protection apparatus main body, the fixation portion may be fixed to a lower portion of the side sill of the vehicle, the protection apparatus main body and the side sill of the vehicle may be disposed to be apart from each other in portions except the fixation portion, the protection apparatus main body may extend to shield the side surface of the battery pack, and the protection apparatus main body and the battery pack may be disposed to be apart from each other in portions except the fixation portion.

The protection apparatus main body is connected and fixed to the lower portion of the side sill of the vehicle via the fixation portion, and the protection apparatus main body extends downwardly to shield the side surface of the battery pack so as to completely and effectively protect the battery pack. Either of the protection apparatus main body and the battery pack, or the protection apparatus main body and the side sill of the vehicle are apart from each other in the portions except the fixation portion. When the collision occurs, the collision force is transmitted to the side sill of the vehicle by the protection apparatus main body via the fixation portion such that majority of the collision force is dispersed to the vehicle body and the collision force to the side surface of the battery pack is significantly reduced. On the other hand, due to the collision force being applied, the protection apparatus main body moves toward the battery pack side. However, the protection apparatus main body and the side sill of the vehicle or the battery pack are apart from each other and not in contact with each other in the portions except the fixation portion such that the collision force whose majority has been absorbed is further absorbed by the gaps formed therebetween to be eliminated, therefore the impact to the battery pack due to the collision force is reduced or prevented.

According to another aspect of the present disclosure, a battery pack side portion may be formed in the battery pack, the battery pack side portion may be connected and fixed to the side sill of the vehicle, and the protection apparatus main body and the battery pack side portion may be disposed to be apart from each other in portions except the fixation portion.

The battery pack is fixed to the vehicle body by the batter pack side portion so as to prevent the collision force from directly applying to the battery pack. At the same time, the protection apparatus main body and the battery pack side portion are apart from each other in the portions except the fixation portion such that this gap can absorb part of the collision force so as to further suitably protect the battery pack.

According to another aspect of the present disclosure, the battery pack side portion may be positioned between a lower surface of the side sill of the vehicle and the protection apparatus main body, and both of the protection apparatus main body and the battery pack side portion may be fixed to the lower surface of the side sill of the vehicle by the fixation portion.

According to the fixation method of fixing the protection apparatus main body and the battery pack side portion to the lower surface of the side sill of the vehicle by using the fixation portion, it is possible to reduce the fixation point, and suitably transmit the force to the side sill of the vehicle so as to reduce the force received by the side surface of the battery pack and effectively protect the battery pack.

According to another aspect of the present disclosure, in the vertical direction, the lowest point of the protection apparatus main body with respect to the horizontal plane may be lower than the lowest point of the battery pack with respect to the horizontal plane.

By setting the lower end of the protection apparatus main body to be lower than the lowest point of the battery pack, it is possible to effectively prevent the lower end of the side surface of the battery pack from coming into contact with the protrusion on the ground directly and further suitably protect the battery pack.

According to another aspect of the present disclosure, the protection apparatus main body may include an extension portion being opposite and apart from the lower surface of the battery pack, and the extension portion and the lower surface of the battery pack may partially overlap each other in the vertical direction.

The protection apparatus main body includes the extension portion being opposite and apart from the lower surface of the battery pack such that even the battery protection apparatus receives the collision to deflect, the lower end of the side surface of the battery pack does not directly collide with the protrusion such as the curbstone or the like. The extension portion suitably cover the side surface of the battery pack to protect the battery pack.

According to another aspect of the present disclosure, a cavity may be formed inside the protection apparatus main body.

By forming such a cavity therein, it is possible to secure a space for absorbing the energy. When the collision is received, the cavity inside the protection apparatus main body is deformed to absorb the collision force such that the dispersion of the collision force and the absorption of the collision energy are suitably performed to reduce the damage to the battery pack and protect the battery pack.

According to another aspect of the present disclosure, the protection apparatus main body may include a first plate and a second plate, the first plate may be closer to the battery pack that the second plate, a portion of the first plate may be formed to be convex toward the battery pack side with respect to the second plate, and the cavity may be formed by connecting two side edges of the first plate and two side edges of the second plate.

The first plate and the second plate are connected to form the protection apparatus main body so as to easily form the protection apparatus main body and to form the internal cavity. The structure of connecting the first plate and the second plate can make the space of the cavity as large as possible to further suitably absorb the collision force.

According to another aspect of the present disclosure, the second plate may be inclined toward the battery pack side from an upper side to a lower side.

The inclination surface formed by the second plate is possible to absorb the collision force by moving the protection apparatus main body toward the battery pack side at the time of receiving the collision by the protrusion on the ground so as to reduce the impact to the battery pack.

According to another aspect of the present disclosure, the first plate may be convex toward the battery pack side to form a bending portion, and a portion of the first plate below the bending portion may form a vertical portion being parallel to the side surface of the battery pack.

Even the collision is received, the vertical portion configured to be parallel to the side surface of the battery pack can disperse the force received by the side surface of the battery pack by sticking to the side surface of the battery pack.

According to another aspect of the present disclosure, a drain hole may be formed in the protection apparatus main body, and the drain hole may be formed in a connection portion of the first plate and the second plate.

By forming the drain hole, it is possible to drain the water entering the inside of the protection apparatus main body. The drain hole is formed in the connection portion of the first plate and the second plate can suitably fix the first plate and the second plate while easily draining the water.

According to another aspect of the present disclosure, the protection apparatus main body may be disposed along either side surface of the battery pack, and at least one end of the protection portion main body may be formed to extend from the side surface of the battery pack toward an adjacent side surface of the battery pack.

The protection apparatus main body is configured to extend from the side surface of the battery pack to the adjacent side surface thereof so as to further suitably protect each side surface of the battery pack and reduce the impact to the battery pack by the collision.

The battery protection apparatus according to each aspect described above can suitably cover the side surface of the battery pack and effectively absorb and reduce the impact to the battery pack, therefore it is possible to suitably protect the battery pack and extend the service life thereof.

According to an aspect of the present disclosure, a vehicle including a battery pack attached to a vehicle body and the battery protection apparatus according to any one of the aspect described above.

Advantageous Effects of Invention

According to the battery protection apparatus and the vehicle described in the present disclosure, the battery protection apparatus includes the protection apparatus main body and the fixation portion, wherein the protection apparatus main body is fixed to the side sill of the vehicle via the fixation portion, and the protection apparatus main body is disposed to be apart from the battery pack while the protection apparatus main body has the cavity formed therein. When the battery protection apparatus receives the collision, the collision force is transmitted to the side sill of the vehicle by the protection apparatus main body via the fixation portion so as to disperse the majority of the collision force to the vehicle body and significantly reduce the collision force to the side surface of the battery pack. On the other hand, the gap is formed between the protection apparatus main body and the battery pack such that the protection apparatus main body moves toward the battery pack side due to the collision force and the upper end of the protection apparatus main body abuts to the protrusion portion of the side sill of the vehicle to further transmit part of the collision force to the vehicle body. Furthermore, the gap formed between the protection apparatus main body and the battery pack can absorb and withdraw part of the collision force so as to reduce the maximum collision force to further protect the battery pack.

DESCRIPTION OF EMBODIMENTS

In order to make the technical problem, the solutions and the effects of the present application more clear, hereinafter, embodiments of the present application will be described with reference to the figures. Hereinafter, the following embodiments are only used to describe the present application and are not used to limit the present application. Also, the configurations described in figures are only specific examples of the present application and the person with ordinary skill in the art can achieve other figures based on the enclosed figures of the present application.

The directions and positional relationships in the present embodiment are described from the viewpoint of passengers in the vehicle.

Figure 1:
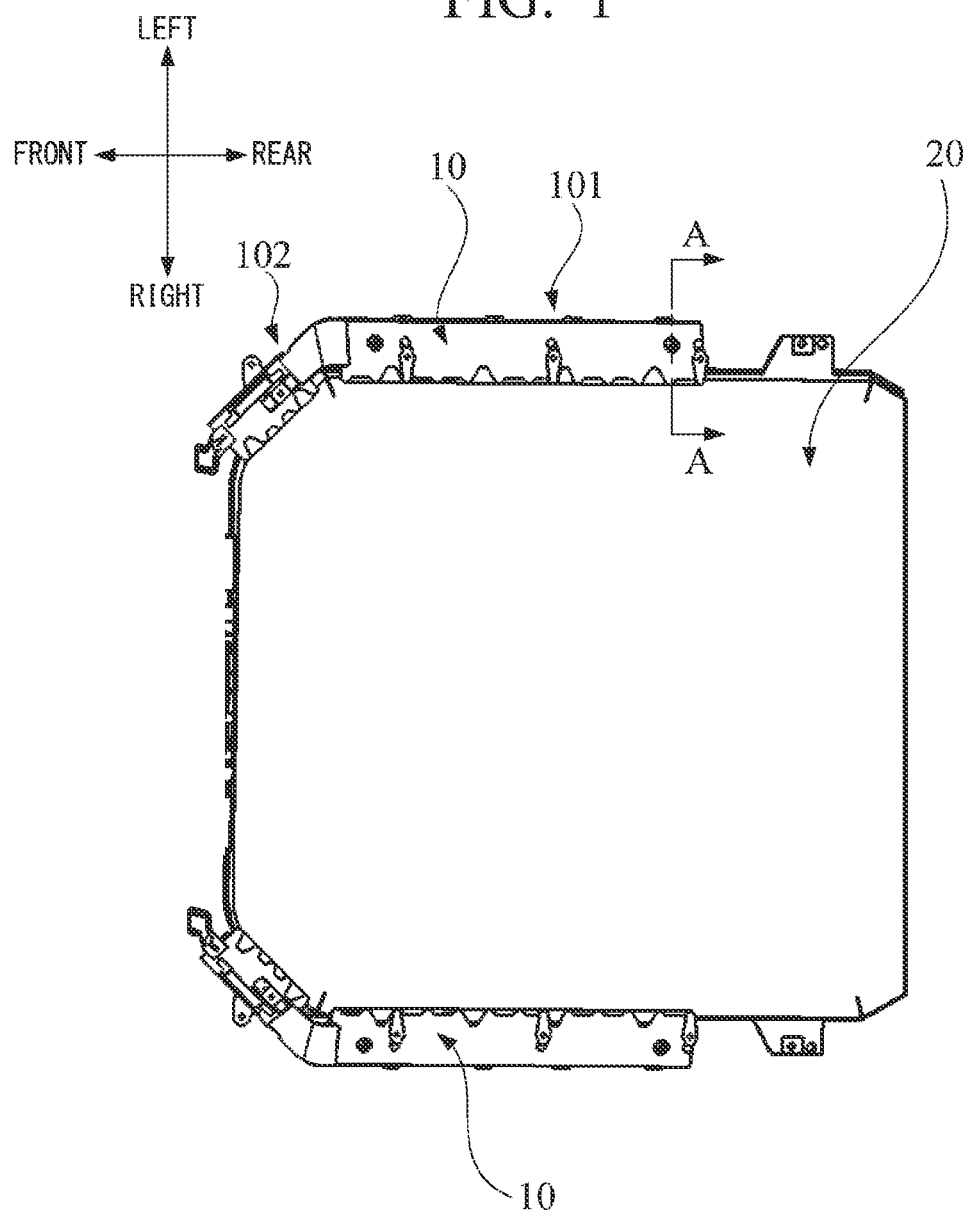
FIG. 1 is an assembly schematic view of a battery protection apparatus according to an embodiment of the present disclosure.

According to the present embodiment, the battery pack is attached to a bottom portion of the vehicle, for example, the battery pack is connected to a floor of the vehicle and below a cabin of the vehicle. In FIG. 1, a battery protection apparatus 10 according to the present embodiment can be disposed at the front/rear side or left/right side of the battery pack 20. Otherwise, the battery protection apparatus 10 can be disposed in either side surface at the front/rear side or left/right side and extend to an adjacent side surface thereof. For example, the battery protection apparatus 10 is disposed at the left side of the battery pack 20 and extend to the front side of the battery pack 20, or the battery protection apparatus 10 is disposed at the right side of the battery pack 20 and extend to the front side of the battery pack 20, or the battery protection apparatus 10 is disposed at the left side of the battery pack 20 and extend to the front side and the rear side of the battery pack 20.

Figure 2:
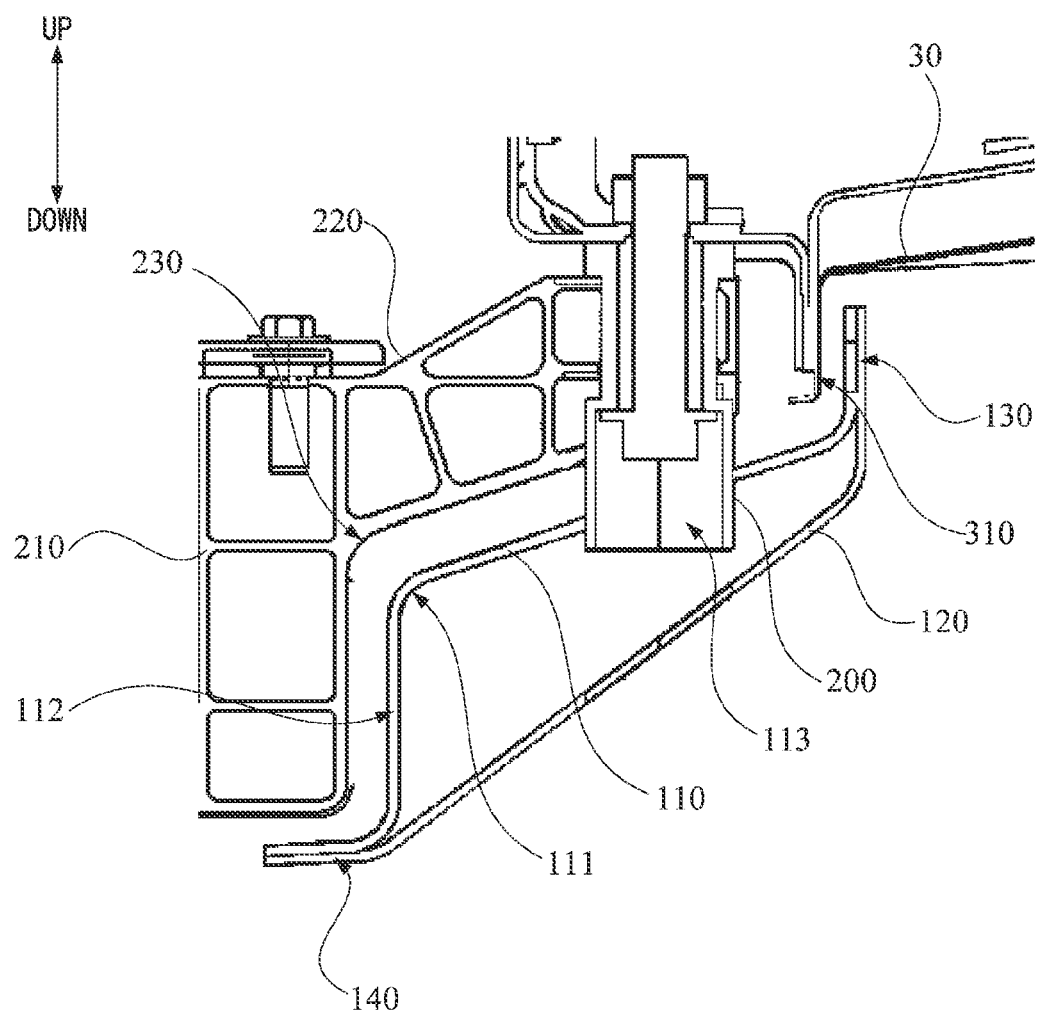
FIG. 2 is a cross-sectional view along the line A-A in the structure shown in FIG. 1.

In FIG. 2, the battery protection apparatus 10 according to the present embodiment includes the protection apparatus main body 100. A protrusion portion 310 extending downwardly is provided in a side sill 30 of the vehicle and the protrusion portion 310 is positioned between the protection apparatus main body 100 and the battery pack 20. In a vertical direction, the highest point of the protection apparatus main body 100 with respect to the horizontal plane is higher than the lowest point of the protrusion portion 310 with respect to the horizontal plane.

Here, one end of the protection apparatus main body 100 is close to the side sill 30 of the vehicle. A portion of this end of the protection apparatus main body 100 that is opposite to the protrusion portion 310 is defined as an upper end portion 130 of the protection apparatus main body 100. The protrusion portion 310 is positioned between the upper portion 130 and the battery pack 20. The highest point of the protection apparatus main body 100 with respect to the horizontal plane is the highest point of the upper end portion 130. In the present embodiment, the protection apparatus 100 is provided in the side surface of the battery pack 20 so as to effectively protect the battery pack 20. At the same time, the protrusion portion 310 of the side sill 30 of the vehicle is positioned between the battery pack 20 and the upper end portion 130 of the protection apparatus main body 100, and the highest point of the upper end portion 130 is higher than the lowest point of the protrusion portion 310. When the vehicle receives the collision force, the protection apparatus main body 100 receives the force to move toward the battery pack 20 side such that the upper end portion 130 comes in contact with the protrusion portion 310 to disperse the majority of the force to the side sill 30 of the vehicle. Accordingly, the impact due to the collision force received by the battery pack 20 is reduced and it is possible to suitably protect the battery pack 20 due to the double protection by the protection apparatus main body 100 and the protrusion portion 310.

In the present embodiment, the protrusion portion 310 is disposed to have a gap with a certain distance from the upper end portion 120 of the protection apparatus main body 100, and the protrusion portion 310 is disposed to have a gap with a certain distance from the battery pack 20. Here, the distance of the gap between the protrusion portion 310 and the upper end portion 130 of the protection apparatus main body 100 may be smaller than the distance of the gap between the protrusion portion 310 and the battery pack 20. The gap between the upper portion 130 of the protection apparatus main body 100 and the protrusion portion 310 and the gap between the protrusion portion 310 and the battery pack can absorb part of the collision force to a certain degree so as to reduce or withdraw the impact due to the collision force received by the battery pack 20.

Furthermore, in FIG. 2, the battery pack 20 according to the present embodiment includes a battery pack main body 210 and a battery pack side portion 220 provided at one side of the battery pack main body 210. The battery pack main body 210 is fixed and connected to the bottom portion of the vehicle. The battery pack side portion 220 is fixed and connected to the lower surface of the side sill 30 of the vehicle. The above-described protrusion portion 310 may be positioned between the upper portion 130 and the battery pack side portion 220. A gap is formed between the protrusion portion 310 and the battery pack side portion 220. The upper end portion 130 of the protection apparatus main body 100 extends upwardly to approach the lower surface of the side sill 30 of the vehicle, and the upper portion 130 and the protrusion portion 310 are positioned at the side surface of the battery pack side portion 220 so as to enhance the protection of the battery pack side portion 220 and further suitably protect the battery pack 20.

In FIG. 2, as a possible embodiment, a fixation portion 200 is provided in the protection apparatus main body 100. The fixation portion 200 is fixed to the lower portion of the side sill 30 of the vehicle. The protection apparatus main body 100 and the side sill 30 of the vehicle are disposed to be apart from each other in the portions except the fixation portion 200. The protection apparatus main body 100 extends downwardly to shield the side surface of the battery pack 20. The protection apparatus main body 100 and the battery pack 20 are disposed to be apart from each other in the portions except the fixation portion 200.

The protection apparatus main body 100 according to the present embodiment is fixed to the lower surface of the side sill 30 of the vehicle via the fixation portion 200 and the protection apparatus main body 100 extends downwardly to shield the side surface of the battery pack 20 so as to completely and effectively protect the battery pack 20. The gaps are formed in the portions except the fixation portion 200 between the protection apparatus main body 100 and the side sill 30 of the vehicle and between the protection apparatus main body 100 and the battery pack 20. It is more preferable that the gap is formed between the protection apparatus main body 100 and the battery pack side portion 220 in the portions except the fixation portion 200.

When the collision is received, the collision force is transmitted to the side sill 30 of the vehicle by the protection apparatus main body 100 via the fixation portion 200 such that the majority of the collision force is dispersed to the vehicle body and the collision force to the side surface of the battery pack 20 is significantly reduced. On the other hand, due to the collision force, the protection apparatus main body 100 moves toward the battery pack 20 side. The protection apparatus main body 100 and the side sill 30 of the vehicle or the battery pack 20 are apart from each other and not in contact in the portions except the fixation portion 200 such that the majority of the collision force is further absorbed or withdrawn by the gaps and the battery pack 20 receives the impact due to less collision force or the battery pack 20 does not receive any impact.

According to the present embodiment, the battery pack side portion 220 is positioned between the lower surface of the side sill 30 of the vehicle and the protection apparatus main body 100, and both the protection apparatus main body 100 and the battery pack side portion 220 are fixed to the lower surface of the side sill 30 of the vehicle via the fixation portion 200. For example, it is possible to fix both of the protection apparatus main body 100 and the battery pack side portion 220 to the lower surface of the side sill 30 of the vehicle by using a mechanical fixation member through the fixation portion 200. In the example shown in FIG. 2, a fixation hole 113 penetrating the fixation portion 200 is formed and the above-described mechanical fixation member is configured to fix the protection apparatus main body 100 and the battery pack side portion 220 to the side sill 30 of the vehicle through the fixation hole 113.

According to the present embodiment, the protection apparatus main body 100 and the battery pack side portion 220 are fixed to the side sill 30 of the vehicle via the same fixation point such that it is possible to reduce the number of the fixation points while further suitably transmitting the force to the side sill 30 of the vehicle and reducing the collision force received by the side surface of the battery pack 20 to effectively protect the battery pack 20.

According to another configuration, the battery pack side portion 220 and the protection apparatus main body 100 may be individually fixed to the side sill 30 of the vehicle. For example, it is possible to use a first mechanical fixation member to fix the protection apparatus main body 100 to the lower surface of the side sill 30 of the vehicle through the fixation portion 200, and then use a second mechanical fixation member to fix the battery pack side portion 220 to the lower surface of the side sill 30 of the vehicle.

According to the present embodiment, in the vertical direction, the lowest point of the protection apparatus main body 100 with respect to the horizontal surface is lower than the lowest point of the battery pack 20 with respect to the horizontal surface. The lower end of the protection apparatus main body 100 is set to be lower than the lowest point of the battery pack 20 such that it is possible to effectively prevent the lower end of the side surface of the battery pack 20 from directly coming into contact with the protrusion on the ground to further suitably protect the battery pack 20.

In the example shown in FIG. 2, it is more preferable that the lower end of the protection apparatus main body 100 extends downwardly until a position below the lower surface of the battery pack 20 to form an extension portion 140. The extension portion 140 is configured to partially overlap the lower surface of the battery pack 20. The protection apparatus main body 100 according to the present embodiment is configured to completely cover the side surface of the battery pack 20 to further suitably protect the battery pack 20. The lower end of the side surface of the battery pack 20 does not directly collides with the protrusion such as the curbstone or the like after the battery protection apparatus 10 receives the collision and deflects, and the side surface of the battery pack 20 is suitably covered by the extension portion 140 for protecting the battery pack 20.

Figure 3:
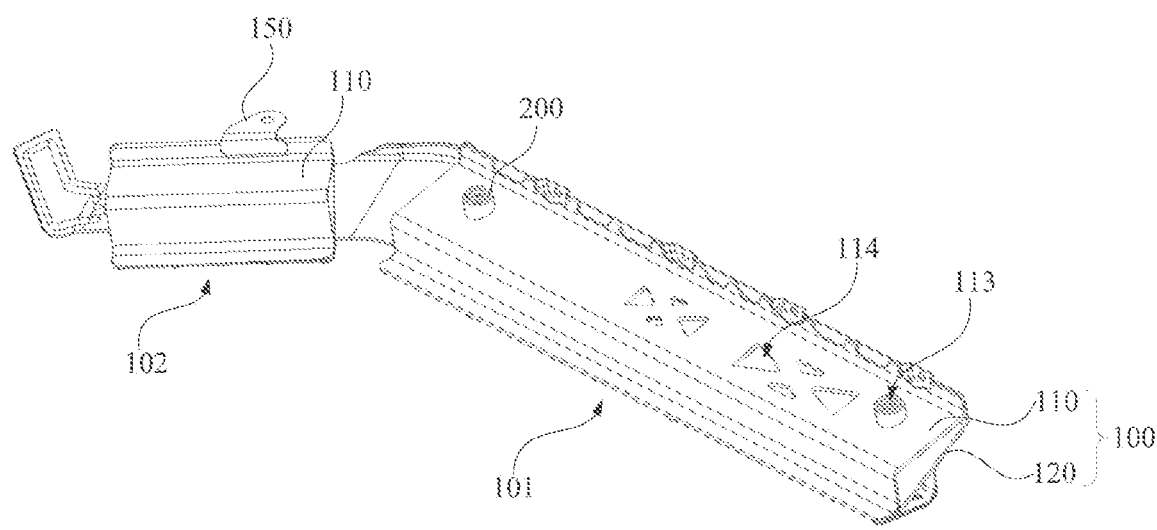
FIG. 3 is a first schematic view showing the structure of the battery protection apparatus according to the embodiment of the present disclosure.

In FIG. 3, the battery protection apparatus 10 includes a fixation stand 150. One end of the fixation stand 150 is connected to the protection apparatus main body 100 and the other end thereof is connected to the vehicle body. The fixation stand 150 is configured to directly connect the battery protection apparatus 10 to the vehicle body. By directly fixing the battery protection apparatus 10 to the vehicle body rather than fixing the battery protection apparatus 10 to the battery pack 20, the region receiving the collision force and the deformation region thereof and the like are limited to the battery protection apparatus 10 so as to reduce the effect to the battery pack 20. Furthermore, due to such a configuration, it is easy for exchanging necessary members.

In FIG. 1 and FIG. 2, in the embodiment in which the battery protection apparatus 10 is provided at the left side of the battery pack 20, and the battery protection apparatus 10 extends toward the front side, the protection apparatus main body 100 includes a first portion 101 covering the left side of the battery pack 20 and a second portion 102 formed to extend toward the front side of the battery pack 20. The first portion 101 of the protection apparatus main body 100 can be directly fixed to the lower surface of the side sill 30 of the vehicle via the fixation portion 200 and by using the mechanical fixation member. The second portion 102 of the protection apparatus main body 100 is connected and fixed to the vehicle body via the above-described fixation stand 150.

As shown in FIG. 2, as a possible embodiment, a cavity is formed inside the protection apparatus main body 100. It is more preferable that a cross section of the cavity has a substantial triangle shape. However, the cross section of the cavity may have other shapes. For example, a shape that can be easily considered by the person with ordinary skill in the art, such as a square shape, a trapezoid shape, a circular shape or the like can be used.

According to the configuration of forming the cavity, it is possible to secure a space for absorbing the energy. The cavity having cross section in a substantial triangle shape is relatively stable. When the collision is received, the cavity inside the protection apparatus main body 100 is deformed to absorb the collision force such that it is beneficial for the dispersion of the collision force and the absorption of the collision energy and it is possible to reduce the damage to the battery pack 20 and further suitably protect the battery pack 20.

In the example as shown in FIG. 2, the protection apparatus 100 includes a first plate 110 close to the battery pack 20 and a second plate 120 being apart and far away from the battery pack 20. The first plate 110 is formed to be convex toward the battery pack 20 side. The fixation portion 200 can be provided in the first plate 110. The second plate 120 may be an inclination plate being inclined downwardly in the vertical direction and toward the battery pack 20 side. The two ends of the first plate 110 and the two ends of the second plate 120 are connected to form the cavity structure having the substantial triangle shape. The battery pack side portion 220 is positioned between the side sill 30 of the vehicle and the first plate 110. The first plate 110 and the side surface of the battery pack 20 or the battery pack side portion 220 are apart from each other by a certain distance to form gaps therebetween.

When the battery protection apparatus 10 receives the collision by the protrusion on the ground, the cavity inside the protection apparatus main body 100 is deformed to receive the collision force. The outward surface of the protection apparatus main body 100 is formed as the inclination surface such that when the inclination surface receives the collision by the protrusion on the ground, the protection apparatus main body 100 is caused to move toward the battery pack 20 side. The gap between the first plate 110 and the battery pack 20 can receive and reduce the collision force.

According to the above-described embodiment, the two ends of the first plate 110 and the two ends of the second plate 120 can be connected by welding; however, the configuration is not limited thereto. The first plate 110 is disposed to be close to the side surface of the battery pack 20 as far as possible so as to enlarge the space in the cavity to absorb more collision force. In the example as shown in FIG. 2, the first plate 110 is formed to be convex toward the connection portion 230 of the battery pack side portion 220 and the battery pack main body 210 so as to enlarge the space in the cavity formed by the first plate 110 and the second plate 120 and having the substantial triangle shape to further suitably absorb the collision force.

Furthermore, the first plate 110 is formed to be convex toward the connection portion 230 of the battery pack side portion 220 and the battery pack main body 210 to form a bending portion 111. A vertical portion 112 being parallel to the side surface of the battery pack main body 210 is disposed below the bending portion 111. When the collision is received, the vertical portion 112 parallel to the side surface of the battery pack main body 210 can stick to the side surface of the battery pack main body 210. Accordingly, the force received by the battery pack 20 is dispersed. The portion of the first plate 110 above the bending portion 111 can be formed to be parallel to the lower surface of the battery pack side portion 220. According to the configuration, when the collision is received, the contact area of the first plate 110 and the battery pack side portion 220 is relatively large such that it is beneficial to disperse the force received by the battery pack 20.

The above-described fixation portion 200 can be provided in the first plate 110. More specifically, it is possible to use the mechanical fixation member to connect the first plate 110 to the battery pack side portion 220 through the fixation hole 113 and further connect to the lower surface of the side sill 30 of the vehicle. A fabrication hole 121 corresponding to the fixation hole 113 may be formed in the second plate 120 for passing through the mechanical fixation member.

In FIG. 3, a lightweight hole 114 is formed in the first plate 110 by cutting out the first plate 110. The lightweight hole 114 is configured to reduce the weight of the battery protection apparatus 10 to a certain degree. The lightweight hole 114 may be formed in the second plate 120.

Figure 4:
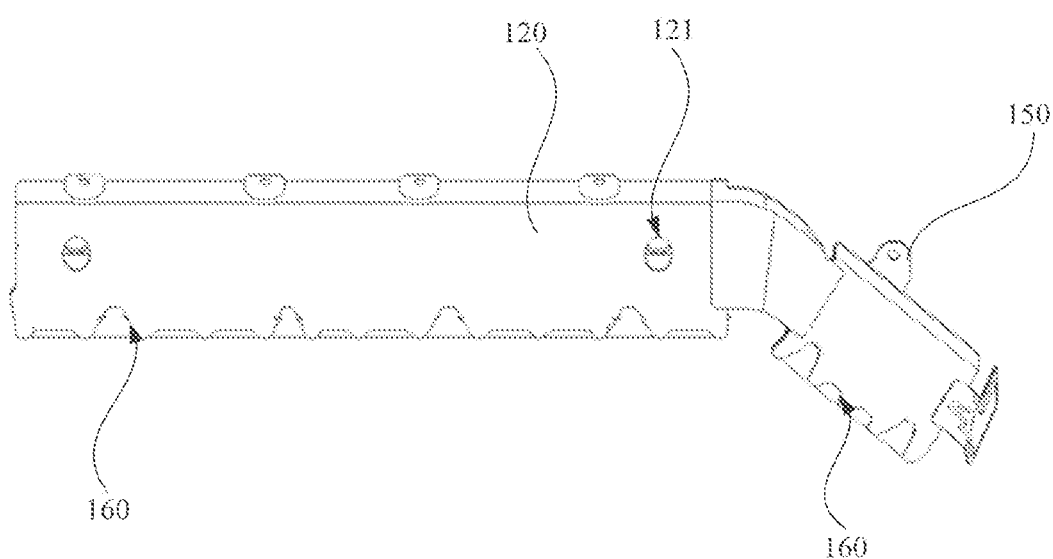
FIG. 4 is a second schematic view showing the structure of the battery protection apparatus according to the embodiment of the present disclosure.

In FIG. 4, a drain hole 160 is formed in the protection apparatus main body 100. The drain hole 160 is disposed in the position where the first plate 110 and the second plate 120 are connected. For example, a plurality of notches are formed in the side edge of the second plate 120 and the notches form the drain hole 160 when the first plate 110 and the second plate 120 are welded together. By forming the drain hole 160 in the connection portion of the first plate 110 and the second plate 120 at the time of connecting the first plate 110 and the second plate 120 to form the protection apparatus main body 100 is possible to configure the drain hole 160 by an easy manufacture method, and it is beneficial for draining the water entering the battery protection apparatus 10. The drain hole 160 may be formed in the first plate 110 and/or the second plate 120 only if the water in the cavity can be drained.

In FIG. 1, a vehicle according to another embodiment of the present disclosure includes a battery pack 20 fixed to the vehicle body and the battery protection apparatus 10 according to the above-described embodiment. The battery protection apparatus 10 is configured to improve the safety of the battery pack 20 at the time when the collision occurs.

In FIG. 1 and FIG. 2, according to the embodiment of the present disclosure, the battery protection apparatus 10 is disposed in the side surface of the battery pack 20. The battery protection apparatus 10 includes the protection apparatus main body 100. The protection apparatus main body 100 includes the first portion 101 covering the left side of the battery pack 20 and the second portion 102 extending to the front side of the battery pack 20. The first portion 101 of the protection apparatus main body 100 is fixed to the lower surface of the side sill 30 of the vehicle via the mechanical fixation member, and the second portion 102 is fixed and connected to the vehicle body via the fixation stand 150. The fixation portion 200 is disposed in the protection apparatus main body 100. The protection apparatus main body 100 includes the first plate 110 close to the battery pack 20 and the second plate 120 being apart from the battery pack 20. The first plate 110 is convex toward the connection portion 230 of the battery pack side portion 220 and the battery pack main body 210. The second plate 120 is the inclination plate being inclined downwardly in the vertical direction and toward the battery pack 20 side. The two side edges of the first plate 110 and the two side edges of the second plate 120 are welded tighter to form the cavity having the substantial triangle shape. The fixation portion 200 is disposed in the first plate 110, and the first plate 110 and the battery pack side portion 220 are fixed and connected to the lower surface of the side sill 30 of the vehicle via the mechanical fixation member through the fixation member 200. The first plate 110 and the battery pack 20 or the side sill 30 of the vehicle are apart from each other to be noncontact in the portions except the fixation portion 200.

The side sill 30 of the vehicle includes the protrusion portion 310 protruding downwardly. The protrusion portion 310 is positioned between the battery pack side portion 220 and the upper end portion 130 of the protection apparatus main body 100. The distance between the protrusion portion 310 and the upper portion 130 of the protection apparatus main body 100 is smaller than the distance between the protrusion portion 310 and the battery pack side portion 220. In the vertical direction, the highest point of the upper end portion 130 is higher than the lowest point of the protrusion portion 310. The lower end of the protection apparatus main body 100 extends downwardly below the lower surface of the battery pack 20 to form the extension portion 140. The extension portion 140 partially overlaps the lower surface of the battery pack 20 in the vertical direction. In the first plate 110, the plurality of lightweight holes 114 are formed. The drain hole 160 is formed in the position connecting the first plate 110 and the second plate 120.

When the collision force is received, the collision force is transmitted to the side sill 40 of the vehicle by the protection apparatus main body 100 via the fixation portion 200 such that the majority of the collision force is dispersed to the vehicle body and the collision force to the side surface of the battery pack 20 is significantly reduced. On the other hand, due to the collision force, the protection apparatus main body 100 moves toward the battery pack 20 side such that the upper end of the protection apparatus main body 100 and the protrusion portion 310 come into contact with each other to transmit part of the collision force to the vehicle body. The protection apparatus main body 100 and the side sill 30 of the vehicle or the battery pack 20 are noncontact in the portions except the fixation portion 200 such that the collision force whose majority has been dispersed is absorbed or withdrawn by the gap formed therebetween. At the same time, the cavity formed inside the protection apparatus main body 100 can absorb the collision force so as to reduce or withdraw the impact to the battery pack 20 due to the collision force. Also, the upper end of the protection apparatus main body 100 extends until the lower surface of the side sill 30 of the vehicle and the lower end of the protection apparatus main body 100 extends to shield part of the lower surface of the battery pack 20 so as to completely protect the side surface of the battery pack 20 and reduce or withdraw the impact to the battery pack 20 due to the collision force.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. The present disclosure is not limited by the above description, and is only limited by the appended claims.

REFERENCE SIGNS LIST

10 Battery protection apparatus
100 Protection apparatus main body
101 First portion
102 Second portion
110 First plate
111 Bending portion
112 Vertical portion
113 Fixing hole
114 Lightweight hole
120 Second plate
121 Fabrication hole
130 Upper end portion
140 Extension portion
150 Fixation stand
160 Drain hole
200 Fixation portion
20 Battery pack
210 Battery pack main body
220 Battery pack side portion
230 Connection portion
30 Side sill
310 Protrusion portion

What is claimed is:

1. A battery protection apparatus provided under a side sill of a vehicle and provided at a side surface of a battery pack under the vehicle, comprising:
   a protection apparatus main body,
   wherein a protrusion portion extending downwardly is formed in the side sill of the vehicle,
   the protrusion portion is positioned between the protection apparatus main body and the battery pack, and
   in a vertical direction, a first distance between a highest point of the protection apparatus main body and a bottom of the vehicle is greater than a second distance between a lowest point of the protrusion portion and the bottom of the vehicle, with respect to a horizontal plane,
   wherein a fixation portion of the protection apparatus main body is fixed to a lower portion of the side sill of the vehicle,
   the protection apparatus main body and the side sill of the vehicle do not contact each other in portions other than the fixation portion,
   the protection apparatus main body extends to shield the side surface of the battery pack,
   the protection apparatus main body and the battery pack do not contact each other in portions other than the fixation portion,
   a battery pack side portion is formed in the battery pack,
   the battery pack side portion is connected and fixed to the side sill of the vehicle, and
   the protection apparatus main body and the battery pack side portion do not contact each other in portions other than the fixation portion.

2. The battery protection apparatus according to claim 1, wherein gaps are located between the protection apparatus main body and the protrusion portion, and between the protrusion portion and the battery pack.

3. The battery protection apparatus according to claim 1, wherein the battery pack side portion is positioned between a lower surface of the side sill of the vehicle and the protection apparatus main body, and
   both of the protection apparatus main body and the battery pack side portion are fixed to the lower surface of the side sill of the vehicle by the fixation portion.

4. The battery protection apparatus according to claim 1, wherein in the vertical direction, the lowest point of the protection apparatus main body with respect to the horizontal plane is lower than the lowest point of the battery pack with respect to the horizontal plane.

5. The battery protection apparatus according to claim 1,
wherein the protection apparatus main body includes an extension portion being opposite and apart from a lower surface of the battery pack, and
the extension portion and the lower surface of the battery pack overlap each other in the vertical direction.

6. The battery protection apparatus according to claim 1, wherein a cavity is formed inside the protection apparatus main body.

7. The battery protection apparatus according to claim 6,
wherein the protection apparatus main body includes a first plate and a second plate, and
the cavity is formed by connecting two side edges of the first plate and two side edges of the second plate.

8. The battery protection apparatus according to claim 7, wherein the second plate is inclined toward a battery pack side from an upper side to a lower side.

9. The battery protection apparatus according to claim 7,
a vertical portion of the first plate, below a bending portion of the first plate, is parallel to the side surface of the battery pack.

10. The battery protection apparatus according to claim 7,
wherein a drain hole is formed in the protection apparatus main body, and
the drain hole is formed in a connection portion of the first plate and the second plate.

11. The battery protection apparatus according to claim 1,
wherein the protection apparatus main body is disposed along any side surface of the battery pack, and
at least one end of the protection apparatus main body is formed to extend from the side surface of the battery pack toward an adjacent side surface of the battery pack.

12. A vehicle, comprising:
a battery pack attached to a vehicle body; and
the battery protection apparatus according to claim 1.

* * * * *